United States Patent

Ling et al.

[11] Patent Number: 6,167,082
[45] Date of Patent: Dec. 26, 2000

[54] ADAPTIVE EQUALIZERS AND METHODS FOR CARRYING OUT EQUALIZATION WITH A PRECODED TRANSMITTER

[75] Inventors: Stanley K. Ling; Ping An; Hiroshi Takatori, all of Sacramento, Calif.

[73] Assignee: Level One Communications, Inc., Sacramento, Calif.

[21] Appl. No.: 09/033,770

[22] Filed: Mar. 3, 1998

Related U.S. Application Data

[60] Provisional application No. 60/039,420, Mar. 6, 1997, abandoned.

[51] Int. Cl.[7] .............................. H03K 5/159; H03H 5/00
[52] U.S. Cl. ........................................ 375/233; 333/28 R
[58] Field of Search ...................... 375/231, 232, 375/233; 330/109; 333/28 R; 364/724.2; 381/103

[56] References Cited

U.S. PATENT DOCUMENTS

| | | |
|---|---|---|
| 3,568,100 | 3/1971 | Tarbox . |
| 3,578,914 | 5/1971 | Simonelli . |
| 3,792,356 | 2/1974 | Kobayashi et al. . |
| 3,798,576 | 3/1974 | Torpie et al. . |
| 3,812,436 | 5/1974 | Fudemoto et al. . |
| 3,824,501 | 7/1974 | Harris . |
| 4,071,827 | 1/1978 | Koike et al. . |
| 4,170,758 | 10/1979 | Tamburelli . |
| 4,270,179 | 5/1981 | Sifford et al. . |
| 4,283,788 | 8/1981 | Tamburelli . |
| 4,412,341 | 10/1983 | Gersho et al. . |
| 4,468,786 | 8/1984 | Davis . |
| 4,494,242 | 1/1985 | Ebrenbard et al. . |
| 4,520,489 | 5/1985 | Hogge, Jr. . |
| 4,583,234 | 4/1986 | Ramadan . |
| 4,700,359 | 10/1987 | Loscher . |

(List continued on next page.)

FOREIGN PATENT DOCUMENTS

| | | |
|---|---|---|
| 0 549 019 A2 | 6/1993 | European Pat. Off. . |
| 0 707 401 A2 | 4/1996 | European Pat. Off. . |

OTHER PUBLICATIONS

W. Zhuang, Adaptive Channel Precoding for Slowly Fading Channels, IEEE, 1994.

Masoomzadeh–Fard, A. et al., "Combined Equalization and Differential Detection Using Precoding", *IEEE*, pp. 76–80 (Apr. 28, 1996).

Meehan, J. P. et al., "Precoding Over a Dynamic Continuous Wave Digital Mobile Channel", *DSP Research Group*, pp. 1140–1144 (Sep. 1997).

*Primary Examiner*—Stephen Chin
*Assistant Examiner*—Albert Park
*Attorney, Agent, or Firm*—Merchant & Gould P.C.

[57] ABSTRACT

Adaptive equalization methods and adaptive equalizers used with precoded systems dominated by intersymbol interference (ISI) monitor the output of a DFE and compare it to a reference for updating a precoder in response to the comparison. To accomplish this, an adaptive equalizer includes a feed forward equalizer receiving a signal from a communication channel, the feed forward equalizer equalizing variations in pre-cursor intersymbol interference resulting from changes in characteristics of the channel and providing an output signal to an error correction decoder, a decision circuit, coupled to the feed forward equalizer, for generating error vectors in response to the output signal of the feed forward equalizer and a decision feedback equalizer, coupled to the decision circuit, the decision feedback equalizer monitoring the pre-cursor intersymbol interference of the channel, determining when the transmitter coefficients to the precoder warrant updating, and generating a signal indicating that an update to the transmitter coefficients to the precoder is warranted. The adaptive equalizer farther includes a comparison circuit, the comparison circuit receiving an output from the decision feedback equalizer and comparing the output from the decision feedback equalizer to a reference, the comparison circuit generating the signal indicating that an update to the transmitter coefficients to the precoder is warranted in response to the comparison.

21 Claims, 9 Drawing Sheets

U.S. PATENT DOCUMENTS

| | | |
|---|---|---|
| 4,760,596 | 7/1988 | Agrawal et al. . |
| 4,789,994 | 12/1988 | Randall et al. . |
| 4,887,278 | 12/1989 | Gupta . |
| 4,896,334 | 1/1990 | Sayar . |
| 5,007,047 | 4/1991 | Sridhar et al. . |
| 5,014,263 | 5/1991 | Vairavan et al. . |
| 5,157,690 | 10/1992 | Buttle . |
| 5,181,228 | 1/1993 | Takatori . |
| 5,214,671 | 5/1993 | Nakai . |
| 5,257,286 | 10/1993 | Ray . |

ADAPTIVE EQUALIZERS AND METHODS FOR CARRYING OUT EQUALIZATION WITH A PRECODED TRANSMITTER

This application claims benefit to provisional application 60/039,420 filed Mar. 6, 1997 now abandoned.

BACKGROUND OF THE INVENTION

1. Field of the Invention

This invention relates in general to an adaptive equalization methods, and more particularly to adaptive equalization methods used with precoded systems dominated by intersymbol interference (ISI).

2. Description of Related Art

Improvements in high-speed computers, networking equipment, and fiber optic technologies are bringing down the cost of building telecommunications facilities. While this trend began in the 1960s, more recent developments in wireless communications and high-speed digital services have broadened the capabilities of existing pipelines and created an appetite for lots of data. In fact, the appetite for data has outpaced the ability of existing networks to deliver it. One problem encountered by networks is intersymbol interference (ISI).

In intersymbol interference, the energy intended in one symbol spills over to the adjacent symbols. FIG. 1 illustrates intersymbol interference between received symbols 100. FIG. 1 illustrates 110 data sent from a transmitting device coupled to a non-ideal channel. The data 110 is divided into a plurality of symbols 112, 114, 116 dispersed over time in a manner so that adjacent symbols do not interfere with each other. Also illustrated in FIG. 1 is the data being received 120. The received data 120 is characterized by symbols 122, 124, 126 that have nonzero values 132, 134, 136 at an adjacent symbols sampling points.

To compensate for the amplitude and phase distortions introduced by the channel, equalizers are used. An equalizer is a discrete time filter for compensating these amplitude and phase distortions. A channel is a time-varying channel with a typically long time constant compared to the symbol period. The channel may be viewed as quasi-static, with a constant impulse response for the duration of a packet. The equalizer has to be adaptive to compensate continuously for nonidealities of the channel. A data packet may include a time-synchronization sequence, known as a training sequence, to derive the transfer characteristic of the channel at the time of transmission, and the data. The receiver then uses a signal processing algorithm to correct errors that occur in subsequent information bits.

FIG. 2 illustrates a typical digital communications system 200 in the presence of ISI. FIG. 2 illustrates a transition scheme for using a two-dimensional modulation. However, those skilled in the art will recognize that the invention and examples described herein are applicable to other types of modulation. Thus, FIG. 2 could be classified as a QAM, or a CAP system, with an in-phase and a quadrature components. FIG. 2 shows the in-phase and quadrature components in the transmitter at location A, where the upper path is the I channel 202 or in-phase and the bottom path is the Q channel 204 or quadrature phase.

Now, similarly in the receiver, in this particular drawing, at the summing node 210 to the right of the analog-to-digital converter (ADC) 212, there is an upper path 220 and a lower path 222. Again, the upper path 220 may be used to decode the in-phase component, and the lower path 222 may be used to equalize the quadrature component. So in each particular path, the signal first passes through the feed forward equalization block 230 of the DFE, and then to a direct DFE feedback loop 232. The DFE feedback loop includes a cross-coupled feedback loop 234. The direct feedback loop 232 will be from the I decision to the I summing node and the Q decision to the Q summing note. And then the cross-coupled components 234 will be from the I decision to the Q summing note, and from the Q decision to the I summing note.

In FIG. 2, the purpose of the feed forward equalizer (FFE) 230 is to cancel the maximum-phase response of the channel, which results in pre-cursor ISI. The purpose of the decision feedback equalizers (DFE) 232, 234 is to cancel the minimum-phase response of the channel, which results in post-cursor ISI. The equivalent channel response from point-A to point-B will be strictly minimum-phase and can be described as:

$$Y_I = X_I * H_{II} + X_Q * H_{QI}, Y_Q = X_Q * H_{QQ} + X_I * H_{IQ},$$

where the term X is used to denote the z-transform response $X=X(z)=x_0+x_1 z^{-1}+x_2 z^{-2}+\ldots$, and the symbol * denotes the z-domain multiplication (time-domain convolution). $H_{II}$ refers to the channel response of the I channel input to the I channel output. $H_{IQ}$ refers to the channel response of the I channel input to the Q channel output. $H_{QQ}$ refers to the channel response of the Q channel input to the Q channel output. $H_{QI}$ refers to the channel response of the Q channel input to the I channel output.

The cross-coupled DFE 234, with coefficients $1-H_{II}$, $-H_{IQ}$, $1-H_{QQ}$, and $-H_{QI}$, is able to equalize the equivalent channel. Using adaptive algorithms driven to the correct solution by the decision error vector (i.e. RLS or LMS adaptation), the DFE can adapt to a correct solution from start-up, and also continuously adapt to equalize any changes in the channel response over time.

As shown in FIG. 2, no error correction coding is used. Therefore, preceding is not necessitated. Thus, the SNR seen at the decision node 240 would be quite high and the error rate would be very low. Now if there are any changes to the channel 250 over time, which would occur for changes in temperature or humidity, the feed forward equalizer 230 and the decision feedback equalizers 232, 234 would be able to handle any changes in the channel, since no equalization is performed in the transmitter other than transmit shaping.

However, the DFE is not the optimum solution if error control coding is utilized in the system, since error propagation in the feedback path and the requirement of accurate, immediate decisions for ISI subtraction both induce performance degradation when high gain error control is necessary.

To eliminate these problems, the minimum-phase response may be equalized by using transmitter-based equalizers, such as pre-emphasis, Tomlinson/Harashima precoder, and Laroia 151 precoder. The minimum-phase response equalization performed at the transmitter must first be trained at the receiver using an adaptive DFE to determine the filter coefficients $1-H_{II}$, $-H_{IQ}$, $1-H_{QQ}$, and $-H_{QI}$, and then transmitted to the receiver during some initialization start-up procedure.

FIG. 3 illustrates a typical precoded digital communications system 300. On the transmit side 310, data is passed through a convolutional encoder 320 and bits are mapped to symbols 322. In FIG. 3, Tomlinson/Harashima preceding 324 is illustrated prior to the digital-to-analog converter 326. However, any method of preceding may be used to illustrate the invention. The signal is then transmitted over the channel 328.

In FIG. 3, the DFE section is moved from the receiver into the transmitter. This is facilitated by the fact that low error rate decisions coming out of the error decision, which feed back into the ISI cancellation, are not needed. Instead, a completely ISI-free estimate could be produced and fed into an error correction decoder. Further, due to one incorrect decision causing multiple decisions immediately thereafter, completely freedom from any error propagation can be provided.

Turning to FIG. 3, again I 330, 340 and Q 332, 342 channels are shown. A standard Tomlinson precoder 324 is in the transmitter portion. Again, the DFE is cross-coupled 350. With regard to the receiver 312, the signal from the channel passes to analog-to-digital converter 360, which is split that into I 340 and Q 342 channels. Next, the same FFE 362 as described with reference to FIG. 2 receives the output of the summing node 364.

If after the FFE 362, there is no ISI left, i.e., the channel has not changed at all, then there is no need to have any type of a remaining DFE to cancel any post cursor ISI that may still exist. All that is needed is to take that output from the FFE 362 and send it into the decoder 366, and at the same time take the output of the FFE 362 and slice that to an extended decision 370, using an extended slicer, which is used with the Tomlinson precoder. That error 372 is used to update the FFE 362 and the echo cancellers 374.

However, if the channel does indeed change, and the output of the FFE 362 does contain some post-cursor ISI, the post-cursor ISI must be cancelled. This post-cursor ISI is cancelled through the use of the DFE 380 in conjunction with the Tomlinson precoder 324 in FIG. 3.

In summary, under perfect conditions where the channel 328 doesn't change, there is no need for the DFE 380 in conjunction with the Tomlinson precoder 324. Only the Tomlinson precoder 324 at the transmitter 310, and at the receiver 312 just the FFE 362 are needed, since the output of the FFE should be ISI free. However, once the channel 328 changes, the coefficients at the transmitter are locked in and thus can't be changed. So if the channel 328 changes, resulting ISI will occur which need to be cancelled. The DFE structure 380 in the receiver 312 allows the cancellation of this resulting ISI.

As suggested above, over time, the channel response may change due to temperature and humidity variation. For a 9kft, 26 AWO copper pair, termed Carrier Serving Area (CSA) Loop #6 from the T1E1.4 set of test loops, an isolated received pulse 400 for three temperatures 410, 412, 414 is shown in FIG. 4. For this case, there is approximately 10 dB of difference between the cold 410 and the hot 414 pulse amplitudes. Differences in the ISI vs. the main tap, which would yield different tap values, also exist. Any change in the maximum-phase response may be dealt with in the FFE by continuous adaptation based on the decision error vector. The minimum-phase response can not be directly and continuously adapted, since the fixed coefficients are now used in the transmitter, where the decision error vector is not available.

It can be seen that there is a need for an adaptive equalizer for adapting a precoder by generating updated coefficients for the precoder.

It can also be seen that there is a need for an adaptive equalizer that monitors the output of a DFE and compares it to a reference for updating a precoder in response to the comparison.

SUMMARY OF THE INVENTION

To overcome the limitations in the prior art described above, and to overcome other limitations that will become apparent upon reading and understanding the present specification, the present invention discloses an adaptive equalization methods used with precoded systems dominated by inter-symbol interference (ISI).

The present invention solves the above-described problems by providing a an adaptive equalizer that monitors the output of a DFE and compares it to a reference for updating a precoder in response to the comparison.

An adaptive equalizer in a communication system having a precoder using transmitter coefficients for pre-equalizing the channel for post-cursor intersymbol interference according to the invention includes a feed forward equalizer receiving a signal from a communication channel, the feed forward equalizer equalizing variations in pre-cursor intersymbol interference resulting from changes in characteristics of the channel and providing an output signal to an error correction decoder, a decision circuit, coupled to the feed forward equalizer, for generating error vectors in response to the output signal of the feed forward equalizer and a decision feedback equalizer, coupled to the decision circuit, the decision feedback equalizer monitoring the pre-cursor intersymbol interference of the channel, determining when the transmitter coefficients to the precoder warrant updating, and generating a signal indicating that an update to the transmitter coefficients to the precoder is warranted.

Other embodiments of a system in accordance with the principles of the invention may include alternative or optional additional aspects One such aspect of the present invention is that the adaptive equalizer further includes a comparison circuit, the comparison circuit receiving an output from the decision feedback equalizer and comparing the output from the decision feedback equalizer to a reference, the comparison circuit generating the signal indicating that an update to the transmitter coefficients to the precoder is warrantted in response to the comparison.

Another aspect of the present invention is that the output of the decision feedback equalizer is combined with the output of the feed forward equalizer at a summing node.

Another aspect of the present invention is that the signal to the error correction decoder is provided after the summing node.

Yet another aspect of the present invention is that the adaptive equalizer further includes an extended decision circuit coupled to the output of the feed forward equalizer, the extended decision circuit providing coefficients to the feed forward equalizer to enable the feed forward equalizer to eliminate substantially all of the intersymbol interference.

Another aspect of the present invention is that the signal to the error correction decoder is provided before the summing node.

Another aspect of the present invention is that the adaptive equalizer further includes an extended decision circuit coupled to the output of the feed forward equalizer, the extended decision circuit providing coefficients to the feed forward equalizer to enable the feed forward equalizer to eliminate substantially all of the intersymbol interference.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides methods of equalizer adaptation for a digital communications system. In particular, the methods are to be used with precoded Systems (i.e. pre-emphasis, Tomlinson/Harashima precoding, Laroia ISI precoding, etc.) in systems dominated by inter-symbol interference (ISI.)

Figure 1:
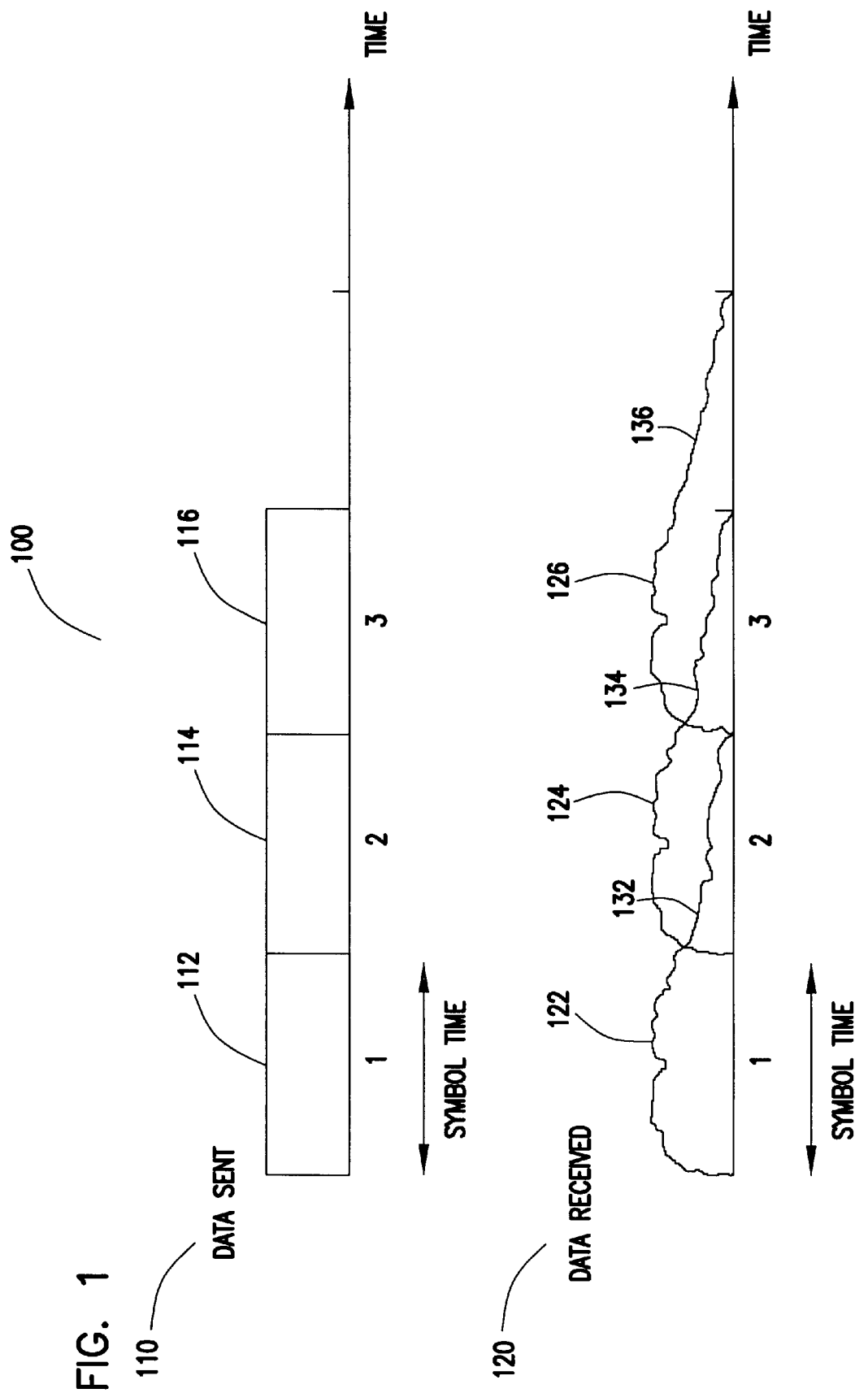
FIG. 1 illustrates intersymbol interference between received symbols.
Figure 2:
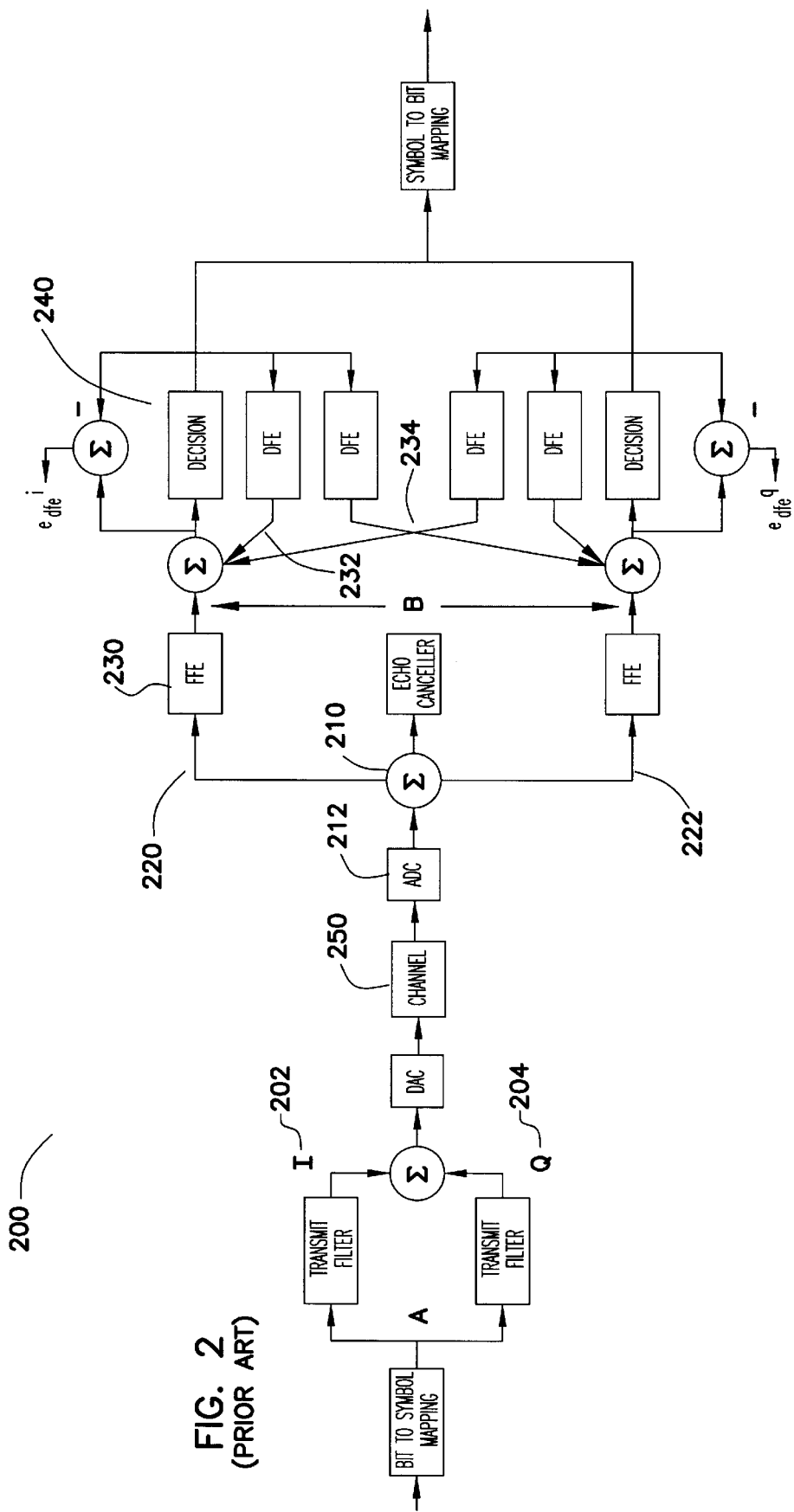
FIG. 2 illustrates a typical digital communications system in the presence of ISI.
Figure 3:
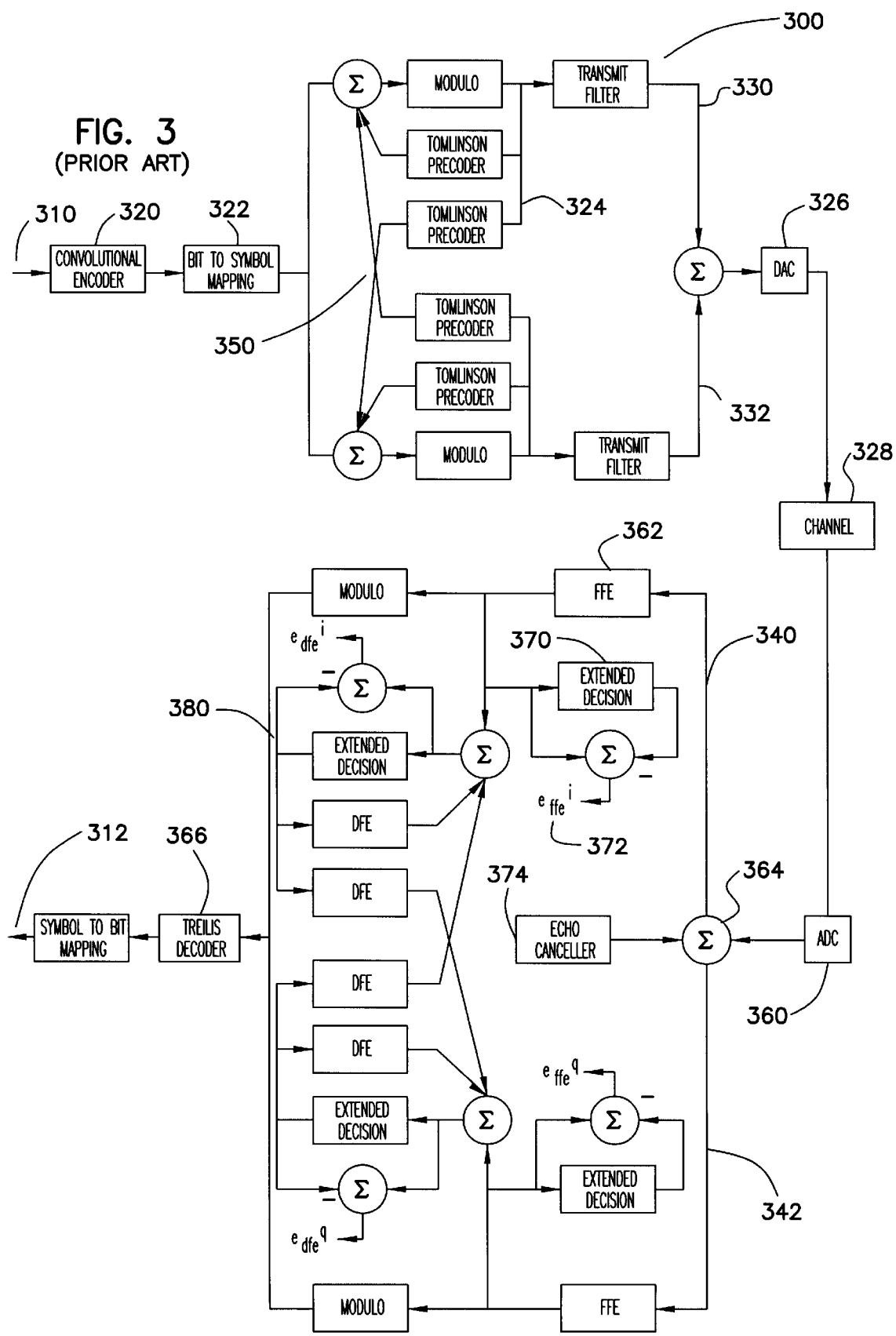
FIG. 3 illustrates a typical precoded digital communications system.
Figure 4:
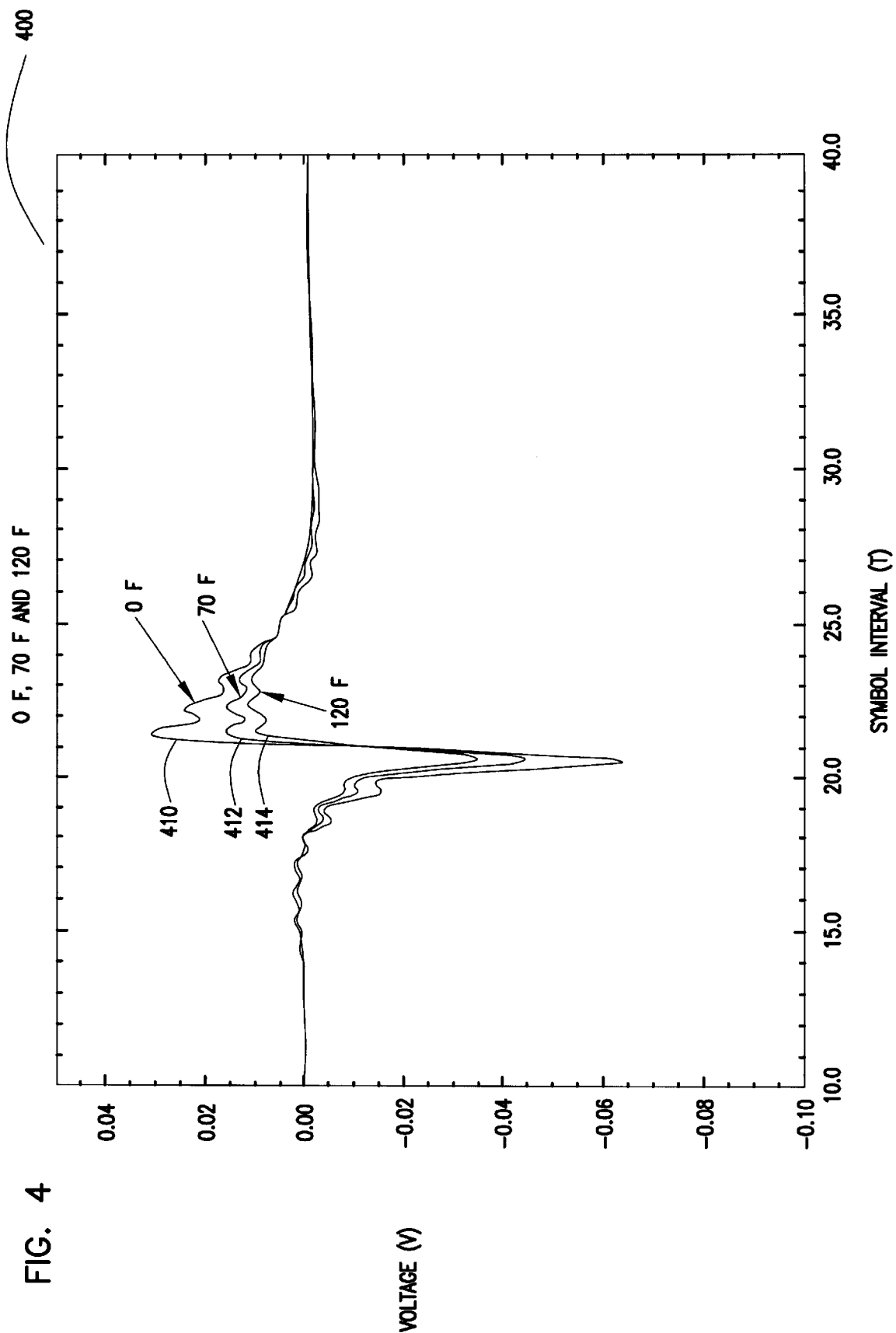
FIG. 4 illustrates an isolated received pulse for three temperatures.

As shown above in FIG. 1, the channel response changes over time resulting in intersymbol interference 132, 134, 136. The changes in the channel response may be due to temperature and humidity variations. As shown in FIG. 2, the equivalent channel response from point-A to point-B changes to $H'_{II}=H_{II}+\Delta H_{II}$, $H'_{IQ}=H_{IQ}+\Delta H_{IQ}$, $H'_{QQ}=H_{QQ}+\Delta H_{QQ}$, and $H'_{QI}=H_{QI}+\Delta_{QI}$, where the addition is performed on an element by element basis. If the new channel response H' is considered as two cross-coupled channels in series, with one cross-coupled channel equivalent to the original channel response, H, then the new channel response can be considered as $H'=H \otimes H''$, where H'' can be determined through adaptation. Each of the individual channel responses can be determined to be:

$$H'_{II}=H_{II} \otimes H''_{II}+H_{IQ} \otimes H''_{QI}$$

$$H'_{IQ}=H_{IQ} \otimes H''_{QQ}+H_{II} \otimes H''_{IQ}$$

$$H'_{QQ}=H_{QQ} \otimes H''_{QQ}+H_{QI} \otimes H''_{IQ}$$

$$H'_{QI}=H_{QI} \otimes H''_{II}+H_{QQ} \otimes H''_{QI}$$

where symbol $\otimes$ denotes the z-domain convolution.

Two straightforward methods exist for updating the transmit precoder coefficients:

1) Disable the precoder and re-train the DFE to the new channel response H', then re-send the coefficients to the transmitter where they are used in place of the original coefficients based on H; and 2) Monitor the residual post-cursor ISI in the receiver with the DFE and adapt to the channel response H' while the transmit precoder is still in use, then re-send the new coefficients to the transmitter and calculate the desired channel response H' based on H and H''.

However, the first method is invasive and would required re-training whenever the channel response varied. The second response is not as invasive but requires the new coefficients to be sent to the transmitter in a specified interval.

FIGS. 5–9 illustrate block diagrams of five adaptation schemes to consider for equalization of the channel response due to changes over time. Assume once start-up training is complete, the FFEs will perform as a noise whitening matched-filter, equalizing only the maximum-phase response of the channel response. The DFEs will equalize only the minimum-phase response of the channel response. A Tomlinson/Harashima preceding equalizer is used, with the adapted DFE coefficients to pre-equalize the transmit signal.

FIGS. 5–9 show the different ways data could be sent to the error correction coder and how a signal can be generated to inform the pre-coder of the need to update. Since, every once in a while, when the error is too large, maybe because the characteristics of the cable have drastically changed, the DFE coefficients to the transmitter will need to be altered. However, the preference will most likely be for the Tomlinson to eliminate all errors. However, if the error is too large, then the coefficients are mismatched in the Tomlinson and the DFE is trying to do too much.

Figure 5:
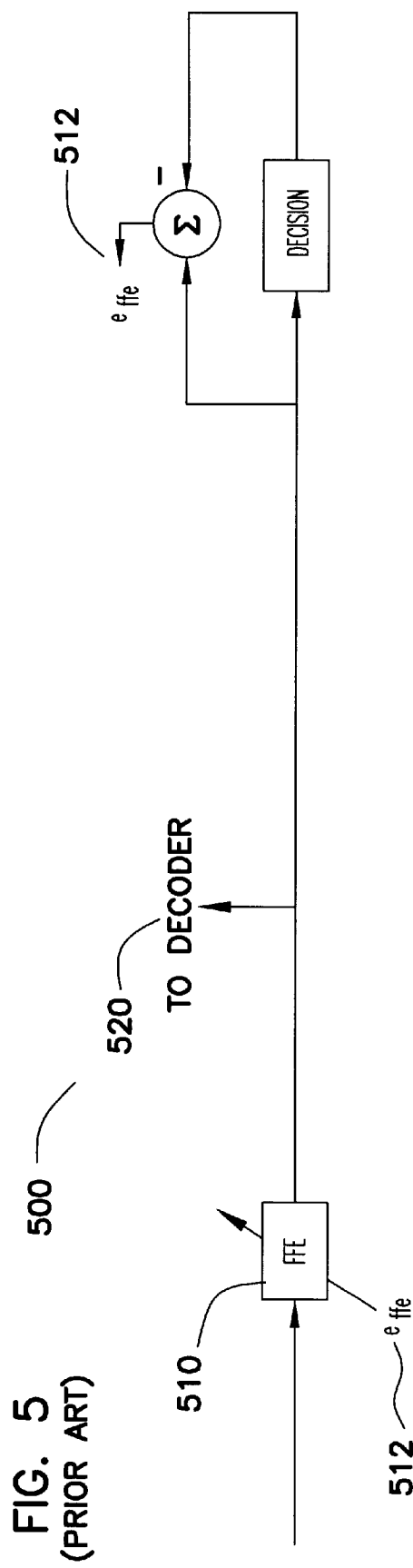
FIG. 5 illustrates a block diagram of a standard adaptation scheme for equalization of a channel response that allows an FFE to adapt to equalize any variation in both the pre-cursor and the post-cursor ISI.

More specifically, FIG. 5 illustrates a block diagram of a standard adaptation scheme 500 for equalization of a channel response that allows an FFE 510 to adapt to equalize any variation in both the pre-cursor and the post-cursor ISI. This is accomplished by training the FFE 510 with the decision error vector 512 at the output of the FFE 510. The output of the FFE 510 is connected to a soft-decision error correction decoder 520. The FFE 510 will not be guaranteed to be a noise-whitening matched filter, and the noise power may be enhanced due to the new frequency response of the FFE 510. Thus, in FIG. 5, a DFE is not used at all, but rather the FFE 510 is left to handle everything.

Figure 6:
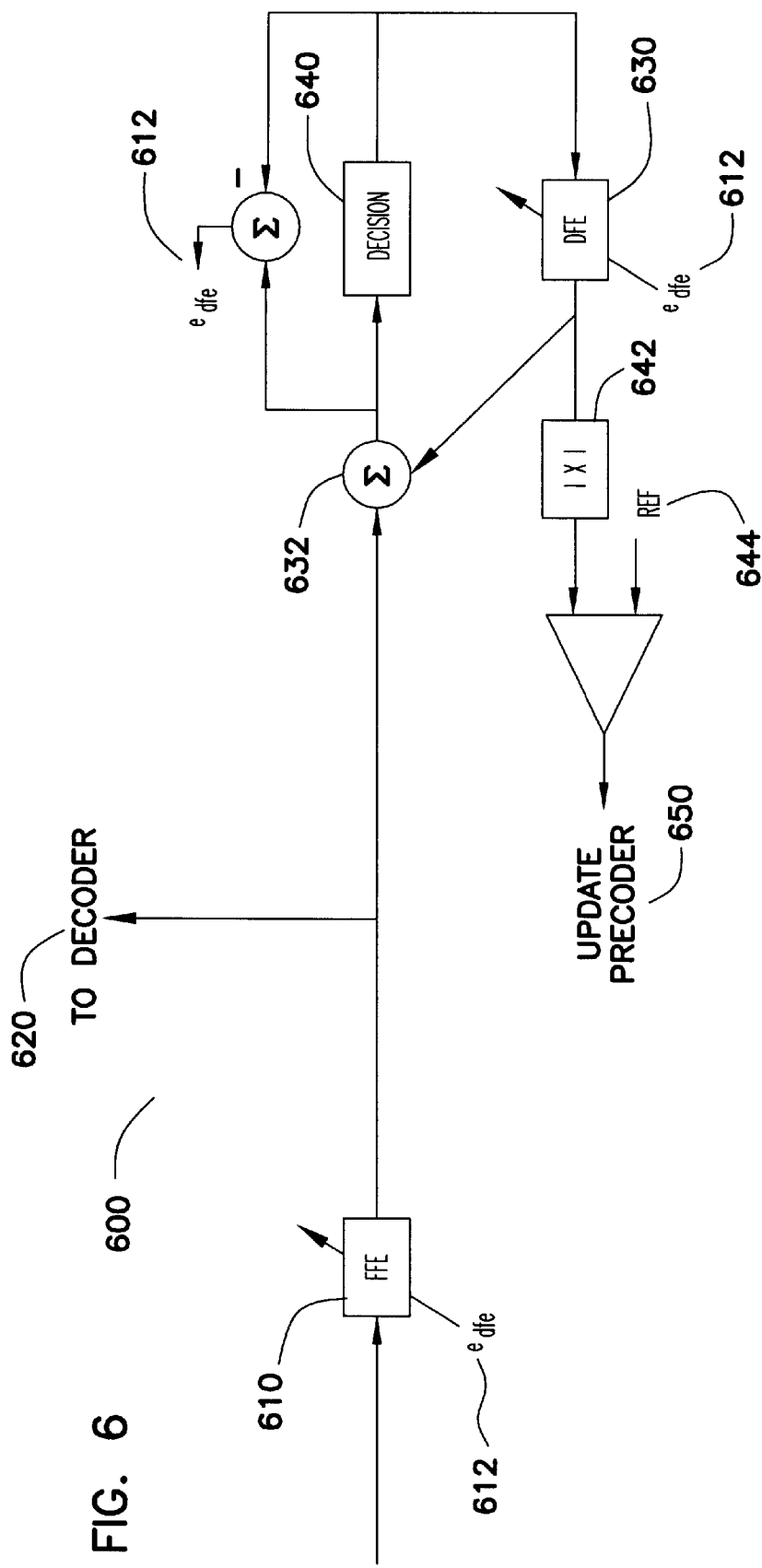
FIG. 6 illustrates a block diagram of an adaptation scheme for equalization of a channel response that allows an FFE to adapt to equalize any variation in the pre-cursor ISI; wherein a signal to the decoder is tapped before the summing node before the decision circuit.

FIG. 6 illustrates a block diagram of an adaptation scheme 600 for equalization of a channel response that allows an FFE 610 to adapt to equalize any variation in the pre-cursor ISI. The DFE 630 is allowed to adapt to equalize any variation in the post-cursor ISI. This is accomplished by training both the FFE 610 and the DFE 630 with the decision error vector 612 at the output of the DFE summing node 632.

The FFE 610 will remain as a noise-whitening matched filter, and no noise enhancement due to the FFE 610 will occur. If the SNR at the input of the decision device 640 is sufficiently low, the symbol error rate will be high. Under this condition, any decision errors injected into the feedback loop, will cause correlated noise at the summing node of the DFE 630. For low SNR, the output of the FFE 610 is connected to the soft-decision error correction decoder 620 to avoid the colored noise of the DFE 630. By monitoring the contribution of the DFE 630 and comparing the absolute value of the DFE contribution 642 with a reference value 644, it can be determined when the channel response has varied sufficiently to cause a loss in performance. When it has been determined that the performance degradation warrants an update of the transmitter coefficients, then the precoder is updated 650 with DFE coefficients that are transferred to the precoder, where the above convolution will yield the updated coefficient values.

Figure 7:
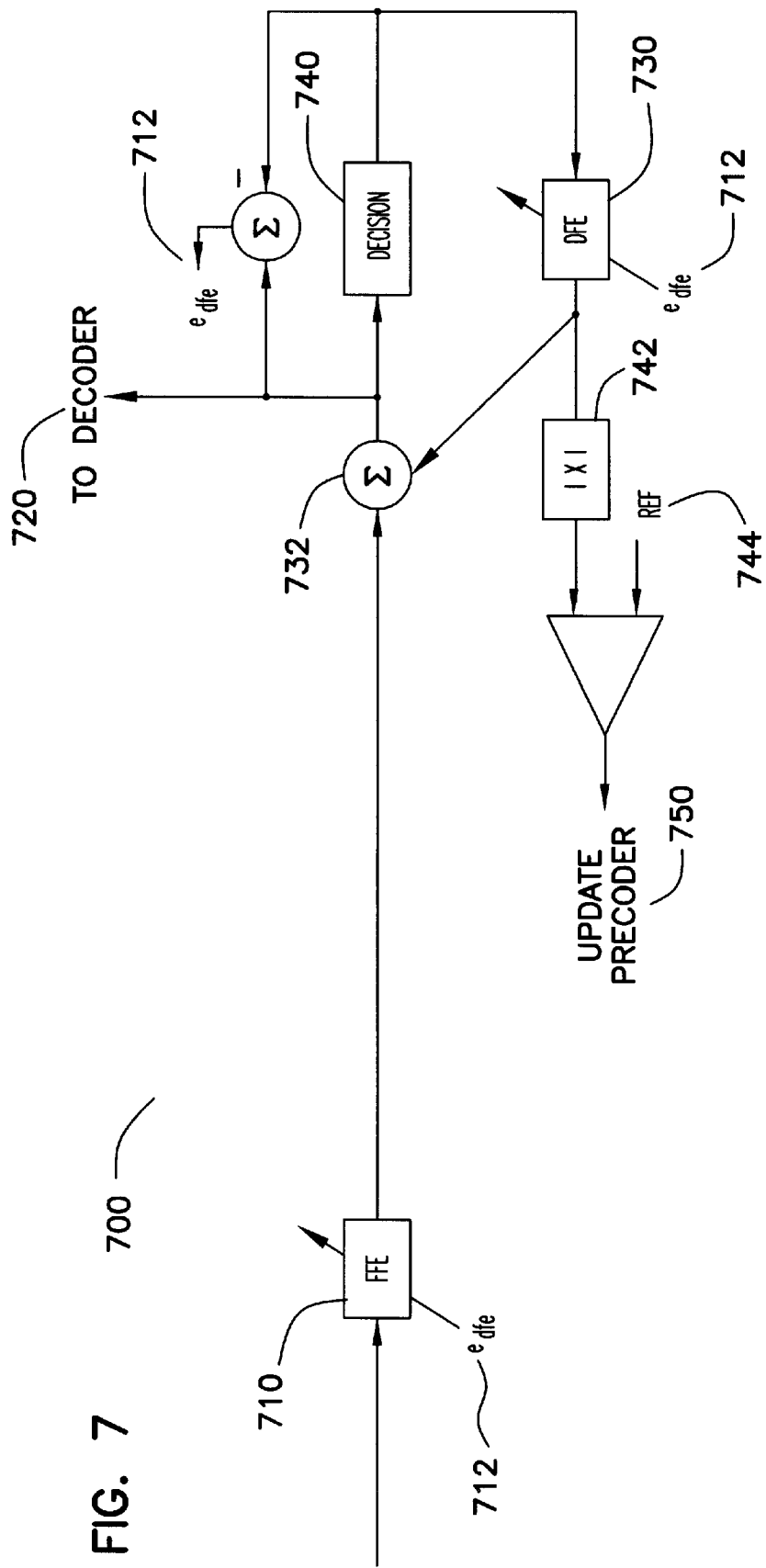
FIG. 7 illustrates a block diagram of an adaptation scheme for equalization of a channel response that allows an FFE to adapt to equalize any variation in the pre-cursor ISI; wherein a signal to the decoder is tapped after the summing node before the decision circuit.

FIG. 7 illustrates a block diagram of an adaptation scheme for equalization 700 of a channel response which is similar to the one described above with reference to FIG. 6. If the SNR at the input of the decision device 740 is sufficiently high, the symbol error rate will be low. If the symbol error rate is low, and the residual post-cursor ISI is small, any colored noise injected by the DFE 730 will be small. Under this condition, the output of the DFE summing node 732 is connected to the soft-decision error correction decoder 720. This allows any residual post-cursor ISI to be cancelled correctly when the SNR is high. The residual post-cursor ISI 742 is also monitored to determine when a transmitter coefficient update 750 should occur.

Figure 8:
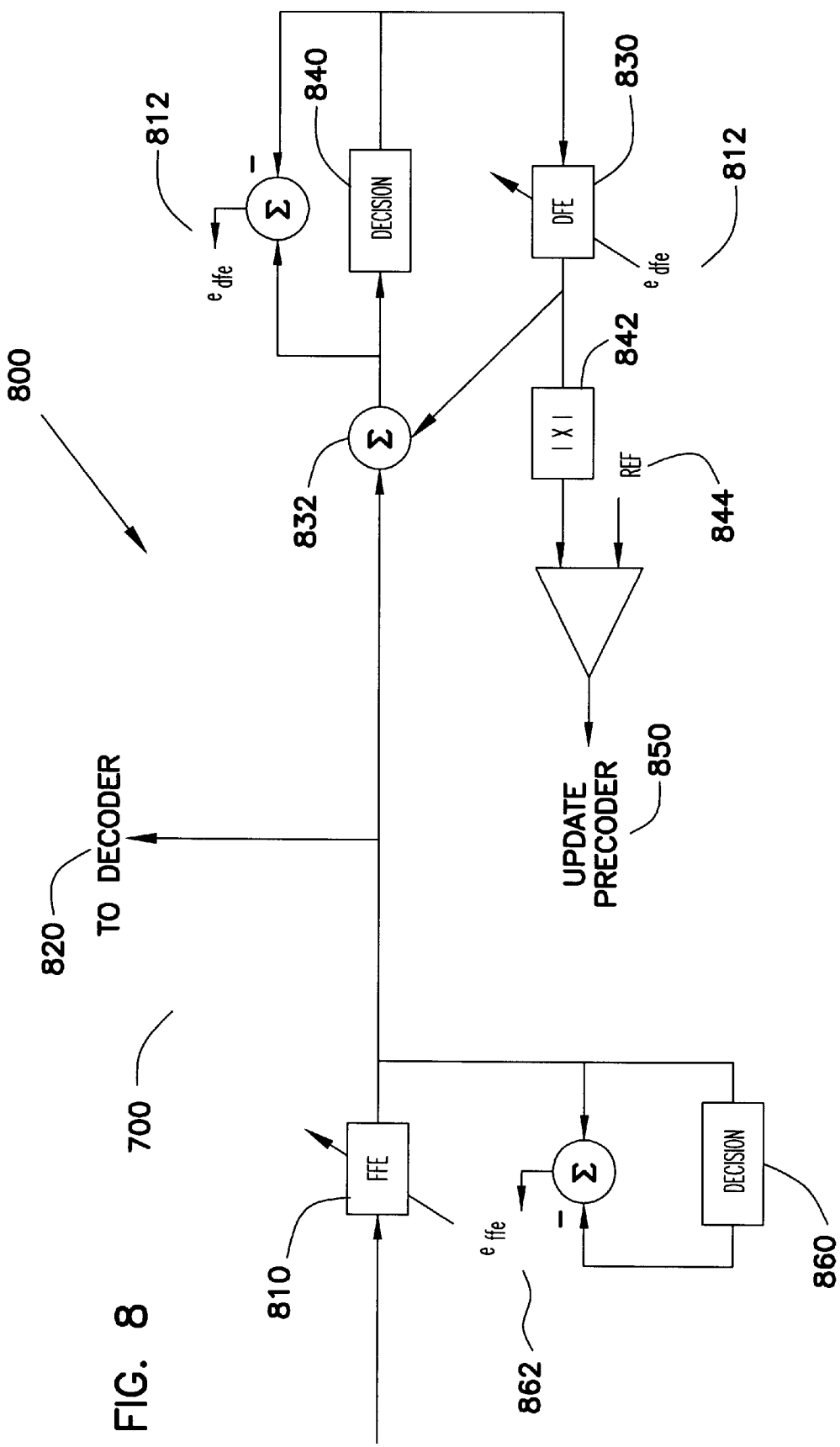
FIG. 8 illustrates a block diagram of an adaptation scheme for equalization of a channel response that allows an FFE to adapt to equalize any variation in both the pre-cursor and the post-cursor ISI wherein the signal to the decoder tapped before the summing node before the decision circuit.

FIG. 8 illustrates a block diagram an adaptation scheme for equalization 800 of a channel response that allows an FFE 810 to adapt to equalize any variation in both the pre-cursor and the post-cursor ISI. The DFE 830 is allowed to adapt to equalize any residual post-cursor ISI which can not be equalized by the FFE 810. This is accomplished by training the FFE 810 with the decision error vector 862 at the output of the FFE 810, and training the DFE 830 with the decision error vector 812 at the output of the DFE summing node 832. In this configuration, the FFE 810, with a small increase in the number of taps from the original noise-whitening matched filter, can cancel a portion of the residual post-cursor ISI, which alone may yield acceptable performance without updating the transmitter coefficients. If the FFE 810 alone can not cancel an acceptable amount of post-cursor ISI, the DFE 830 will adapt to a solution to cancel it. When the amount of ISI at the DFE 830 reaches a certain value, transmitter coefficient update will occur. As with the adaptation scheme of FIG. 6, the output of the FFE 810 is connected to the soft-decision error correction decoder 820.

Figure 9:
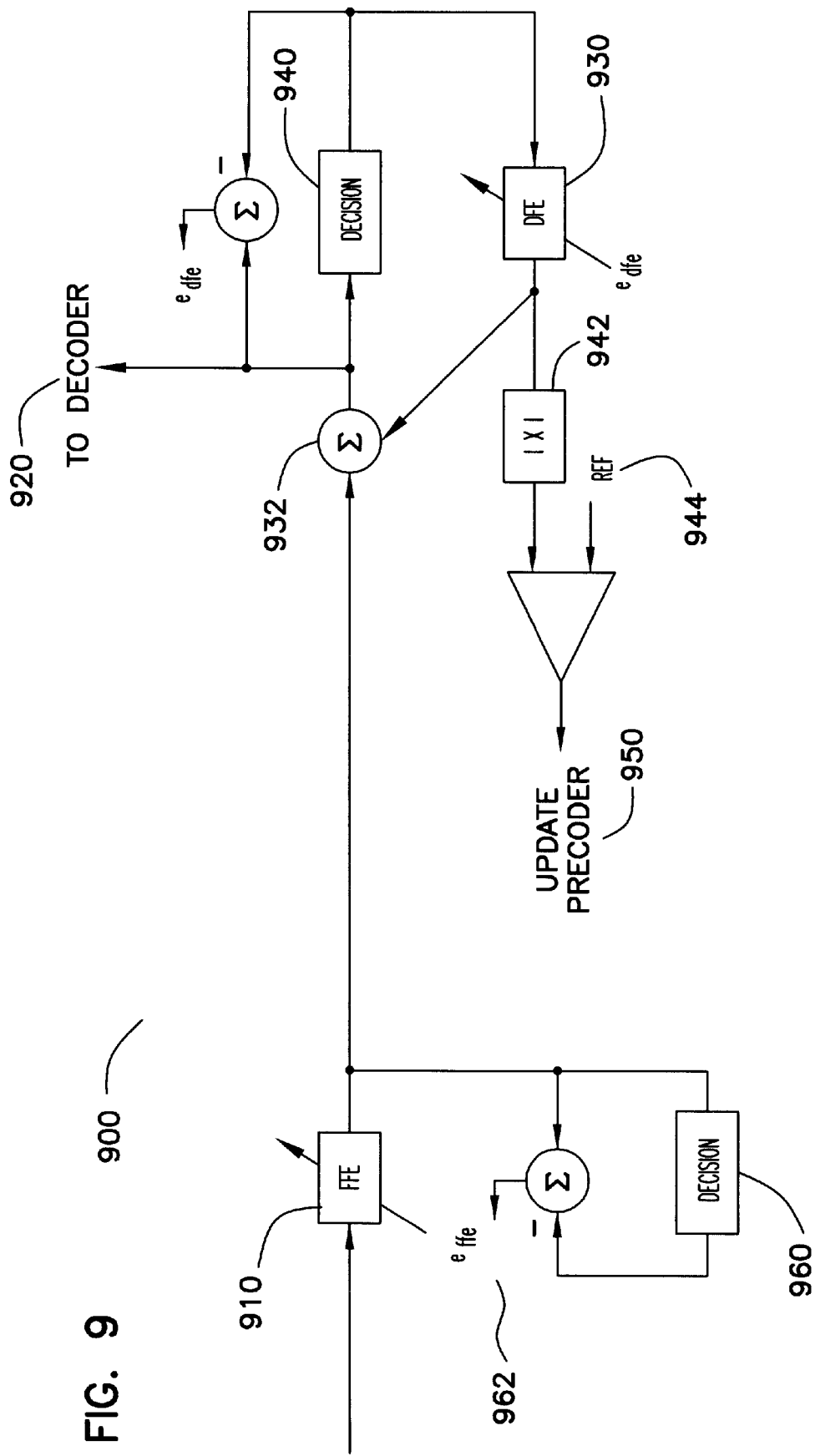
FIG. 9 illustrates a block diagram of an adaptation scheme for equalization of a channel response that allows an FFE to adapt to equalize any variation in both the pre-cursor and the post-cursor ISI wherein the signal to the decoder tapped after the summing node before the decision circuit.

FIG. 9 illustrates a block diagram of an adaptation scheme 900 for equalization of a channel response that is similar to the one described above with reference to FIG. 8. However, as in FIG. 7, the output of the DFE summing node 932 is connected to the soft-decision error correction decoder 920.

In the adaptation schemes for equalization 500, 600, 800 in FIGS. 5, 6 and 8, the signal directly from the FFEs 510, 610, 810 is sent to the decoder 520, 620, 820. However, in FIGS. 7 and 9, the signal from the node at the input of the slicer 740, 940 is sent to the decoder 720, 920, rather than the output of the FFE 710, 910 directly. Since the Tomlinson precoder has already been used, any resulting post-cursor ISI will be very small and therefore will not affect the corrections.

The adaptation scheme for equalization 600 of FIG. 6 would be used if large changes in the post-cursor ISI are expected. The adaptation scheme for equalization 800 of FIG. 8 would be used if those changes are very small. The difference between the adaptation scheme for equalization 600, 700 of FIGS. 6 and 7 and the adaptation scheme for equalization 800, 900 of FIGS. 8 and 9 is in the method of adapting the FFEs and the DFEs. If it is desirable for the FFEs to handle as much ISI as possible, then the adaptation scheme for equalization 800, 900 of FIGS. 8 and 9 are preferable because the FFEs 810, 910 are adapting using their own error 862, 962 and the DFEs 830, 930 are just going to handle whatever is left.

However, in the adaptation scheme for equalization 800, 900 of FIGS. 8 and 9, the FFEs 810, 910 and the DFEs 830, 930 aren't working together, but it is rather an intermediate solution. Essentially, the FFEs 810, 910 are allowed to handle as much ISI as possible and the DFEs 830, 930 are relegated the rest of the responsibility. Still, the adaptation scheme for equalization 800, 900 of FIGS. 8 and 9 may be preferable if a limit in re-transmission between both sides is desired. In contrast, with reference to the adaptation scheme for equalization 600, 700 of FIGS. 6 and 7, the FFEs 610, 710 and the DFEs 630, 730 are working together, i.e., joint optimization.

In summary, methods of equalizer adaptation for a digital communications system have been disclosed. In particular, the methods are to be used with precoded Systems (i.e. pre-emphasis, Tomlinson/Harashima precoding, Laroia ISI precoding, etc.) in systems dominated by inter-symbol interference (ISI.)

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An adaptive equalizer in a communication system having a precoder using transmitter coefficients for pre-equalizing the channel for post-cursor intersymbol interference, comprising:
    a feed forward equalizer receiving a signal from a communication channel, the feed forward equalizer equalizing variations in pre-cursor intersymbol interference resulting from changes in characteristics of the channel and providing an output signal to an error correction decoder;
    a decision circuit, coupled to the feed forward equalizer, for generating error vectors in response to the output signal of the feed forward equalizer; and
    a decision feedback equalizer, coupled to the decision circuit, the decision feedback equalizer monitoring the pre-cursor intersymbol interference of the channel, determining when the transmitter coefficients to the precoder warrant updating, and generating a signal indicating that an update to the transmitter coefficients to the precoder is warranted.

2. The adaptive equalizer of claim 1 further comprising a comparison circuit, the comparison circuit receiving an output from the decision feedback equalizer and comparing the output from the decision feedback equalizer to a reference, the comparison circuit generating the signal indicating that the update to the transmitter coefficients to the precoder is warranted in response to the comparison.

3. The adaptive equalizer of claim 2 wherein the output of the decision feedback equalizer is combined with the output of the feed forward equalizer at a summing node.

4. The adaptive equalizer of claim 3 wherein the signal to the error correction decoder is provided after the summing node.

5. The adaptive equalizer of claim 4 further comprising an extended decision circuit coupled to the output of the feed forward equalizer, the extended decision circuit providing coefficients to the feed forward equalizer to enable the feed forward equalizer to eliminate substantially all of the intersymbol interference.

6. The adaptive equalizer of claim 3 wherein the signal to the error correction decoder is provided before the summing node.

7. The adaptive equalizer of claim 6 further comprising an extended decision circuit coupled to the output of the feed forward equalizer, the extended decision circuit providing coefficients to the feed forward equalizer to enable the feed forward equalizer to eliminate substantially all of the intersymbol interference.

8. A communication system, comprising:
   a transmitter coupled to a first end of a communication channel, the transmitter transmitting data signals over the communication channel, the transmitter further comprising a precoder using transmitter coefficients for pre-equalizing the channel for post-cursor intersymbol interference; and
   a receiver, coupled to a second end of the communication channel, the receiver further comprising:
      a feed forward equalizer receiving a signal from the communication channel, the feed forward equalizer equalizing variations in pre-cursor intersymbol interference resulting from changes in characteristics of the channel and providing an output signal to an error correction decoder;
      a decision circuit, coupled to the feed forward equalizer, for generating error vectors in response to the output signal of the feed forward equalizer; and
      a decision feedback equalizer, coupled to the decision circuit, the decision feedback equalizer monitoring the pre-cursor intersymbol interference of the channel, determining when the transmitter coefficients to the precoder warrant updating, and generating a signal indicating that an update to the transmitter coefficients to the precoder is warranted.

9. The communication system of claim 8 further comprising a comparison circuit, the comparison circuit receiving an output from the decision feedback equalizer and comparing the output from the decision feedback equalizer to a reference, the comparison circuit generating the signal indicating that the update to the transmitter coefficients to the precoder is warranted in response to the comparison.

10. The communication system of claim 9 wherein the output of the decision feedback equalizer is combined with the output of the feed forward equalizer at a summing node.

11. The communication system of claim 10 wherein the signal to the error correction decoder is provided after the summing node.

12. The communication system of claim 11 further comprising an extended decision circuit coupled to the output of the feed forward equalizer, the extended decision circuit providing coefficients to the feed forward equalizer to enable the feed forward equalizer to eliminate substantially all of the intersymbol interference.

13. The communication system of claim 10 wherein the signal to the error correction decoder is provided before the summing node.

14. The communication system of claim 13 further comprising an extended decision circuit coupled to the output of the feed forward equalizer, the extended decision circuit providing coefficients to the feed forward equalizer to enable the feed forward equalizer to eliminate substantially all of the intersymbol interference.

15. A method for performing equalization of a communication channel having a transmitter with a precoder coupled thereto, the precoder using transmitter coefficients for pre-equalizing the communication channel for post-cursor intersymbol interference, the method comprising the steps of:
   receiving a signal from the communication channel;
   equalizing variations in pre-cursor intersymbol interference in the signal resulting from changes in characteristics of the channel using a feed forward equalizer and providing an output signal to an error correction decoder;
   generating error vectors in response to the output signal of the feed forward equalizer by a decision circuit;
   monitoring the pre-cursor intersymbol interference of the channel by the decision feedback equalizer;
   determining when the transmitter coefficients to the precoder warrant updating based upon the monitored pre-cursor intersymbol interference; and
   generating a signal indicating that an update to the transmitter coefficients to the precoder is warranted.

16. The method of claim 15 further comprising the steps of:
   comparing an output from the decision feedback equalizer to a reference;
   generating the signal indicating that the update to the transmitter coefficients to the precoder is warranted in response to the comparison.

17. The method of claim 16 wherein an output of the decision feedback equalizer is combined with an output of the feed forward equalizer at a summing node.

18. The method of claim 17 wherein the output signal to the error correction decoder is provided after the summing node.

19. The method of claim 18 further comprising the step of processing the output signal of the feed forward equalizer to provide coefficients to the feed forward equalizer to enable the feed forward equalizer to eliminate substantially all of the intersymbol interference.

20. The method of claim 17 wherein the output signal to the error correction decoder is provided before the summing node.

21. The method of claim 20 further comprising the step of processing the output signal of the feed forward equalizer to provide coefficients to the feed forward equalizer to enable the feed forward equalizer to eliminate substantially all of the intersymbol interference.

* * * * *